(12) United States Patent
Takeuchi et al.

(10) Patent No.: US 10,060,375 B2
(45) Date of Patent: Aug. 28, 2018

(54) ABNORMALITY DIAGNOSIS APPARATUS AND ABNORMALITY DIAGNOSIS METHOD

(71) Applicant: DENSO CORPORATION, Kariya, Aichi-pref. (JP)

(72) Inventors: Hisaharu Takeuchi, Kariya (JP); Ryou Katsura, Kariya (JP)

(73) Assignee: DENSO CORPORATION, Kariya (JP)

( * ) Notice: Subject to any disclaimer, the term of this patent is extended or adjusted under 35 U.S.C. 154(b) by 296 days.

(21) Appl. No.: 15/016,812

(22) Filed: Feb. 5, 2016

(65) Prior Publication Data

US 2016/0230687 A1    Aug. 11, 2016

(30) Foreign Application Priority Data

Feb. 10, 2015  (JP) .................................. 2015-24542

(51) Int. Cl.
| | |
|---|---|
| *G01N 11/00* | (2006.01) |
| *F02D 41/22* | (2006.01) |
| *F02D 41/00* | (2006.01) |
| *F02M 21/02* | (2006.01) |
| *F02D 19/02* | (2006.01) |

(52) U.S. Cl.
CPC ........... *F02D 41/22* (2013.01); *F02D 19/025* (2013.01); *F02D 19/027* (2013.01); *F02D 41/0027* (2013.01); *F02M 21/0212* (2013.01); *F02M 21/0245* (2013.01); *F02D 2041/225* (2013.01); *F02D 2200/0606* (2013.01); *Y02T 10/32* (2013.01); *Y02T 10/40* (2013.01)

(58) Field of Classification Search
CPC .... F25B 2500/222; F25B 49/005; F17D 5/02; F17D 5/06; G01M 3/002; G01M 3/2807
See application file for complete search history.

(56) References Cited

U.S. PATENT DOCUMENTS

| 5,415,033 A * | 5/1995 | Maresca, Jr. ....... G01M 3/2807 73/40.5 R |
| 5,883,815 A * | 3/1999 | Drakulich ............. G01M 3/002 340/501 |
| 2006/0108003 A1 * | 5/2006 | Bradford ............. G01M 3/2807 137/487.5 |

(Continued)

FOREIGN PATENT DOCUMENTS

| JP | 8-277750 | 10/1996 |
| JP | 11-107860 | 4/1999 |
| JP | 2003-206825 | 7/2003 |

(Continued)

*Primary Examiner* — Elias Desta
(74) *Attorney, Agent, or Firm* — Nixon & Vanderhye P.C.

(57) ABSTRACT

An abnormality diagnosis apparatus is an apparatus that diagnoses a fuel leak from a fuel passage to circulate a liquefied gas fuel between a fuel tank and an internal combustion engine. The abnormality diagnosis apparatus includes: a control device; a low-pressure temperature sensor arranged at a discharge port of a feed pump; and a high-pressure temperature sensor arranged at an overflow fuel emission port of a supply pump. The control device detects a decrease in the temperature of the liquefied gas fuel at the overflow fuel emission port on the basis of a comparison between the measured values of the two temperature sensors, thereby determining that the fuel leak is caused in a section from the discharge port to the overflow fuel emission port.

12 Claims, 10 Drawing Sheets

(56) References Cited

U.S. PATENT DOCUMENTS

2011/0185791 A1* 8/2011 van Staden ........... G01M 3/002
                                                          73/40.7

FOREIGN PATENT DOCUMENTS

| JP | 2006-118518 | 5/2006 |
| JP | 2007-113548 | 5/2007 |
| JP | 2010-203330 | 9/2010 |

* cited by examiner

ABNORMALITY DIAGNOSIS APPARATUS AND ABNORMALITY DIAGNOSIS METHOD

CROSS REFERENCE TO RELATED APPLICATION

This application is based on Japanese Patent Application No. 2015-24542 filed on Feb. 10, 2015, the disclosure of which is incorporated herein by reference.

TECHNICAL FIELD

The present disclosure relates to an abnormality diagnosis apparatus and an abnormality diagnosis method diagnosing a fuel leak from a fuel passage to circulate fuel between a fuel tank and an engine.

BACKGROUND

Recently, for example, JP 2007-113548A discloses an apparatus that detects a fuel leak in a leak fuel system to return a leak fuel to a fuel tank from an internal combustion engine. In this apparatus, in a case where a temperature detected by a temperature sensor arranged in the leak fuel system is decreased, for example, to as low a value as an outside air temperature, it is determined that a fuel leak from the leak fuel system to the outside is caused.

However, this device is so constructed as to measure the temperature of the fuel at only one specified position of the leak fuel system. Hence, the device can diagnose a fuel leak only in a state where the leak fuel stably flows in the leak fuel system in a continuous steady operating state of the internal combustion engine. In addition, in a case where the fuel flowing in the leak fuel system is a liquid fuel, as far as a serious fuel leak of a degree in which the leak fuel reaching the temperature sensor is lost is not caused, a clear decrease in the temperature is hard to occur. For this reason, in the construction described above, it is difficult to detect a small amount of fuel leak.

SUMMARY

It is an object of the present disclosure to provide an abnormality diagnosis apparatus and an abnormality diagnosis method capable of diagnosing a fuel leak from a fuel passage with high accuracy even if an internal combustion engine is not in a steady operating state.

An abnormality diagnosis apparatus of the present disclosure diagnoses a fuel leak from a fuel passage to circulate a liquefied gas fuel between a fuel tank and an engine. The abnormality diagnosis apparatus includes: a first measuring part that is arranged at a first part of either of the fuel tank and the fuel passage and that measures a temperature of the liquefied gas fuel; a second measuring part that is arranged at a second part different from the first part of the fuel passage and that measures the temperature of the liquefied gas fuel; and a determination part that detects a decrease in the temperature of the liquefied gas fuel at the second part on the basis of a comparison between a measured value of the first measuring part and a measured value of the second measuring part, thereby determining that the fuel leak is caused in a section between the first part and the second part of the fuel passage.

Further, an abnormality diagnosis method diagnoses a fuel leak from a fuel passage to circulate a liquefied gas fuel between a fuel tank and an engine by a processor. This abnormality diagnosis method includes: an acquisition step acquiring a temperature of the liquefied gas fuel measured by a first measuring part arranged at a first part of either of the fuel tank and the fuel passage and a temperature of the liquefied gas fuel measured by a second measuring part arranged at a second part different from the first part of the fuel passage; and a determination step detecting a decrease in the temperature of the liquefied gas fuel at the second part on the basis of a comparison between a measured value of the first measuring part and a measured value of the second measuring part to thereby determine that the fuel leak is caused in a section between the first part and the second part of the fuel passage.

Fluid flowing in the fuel passage is the liquefied gas fuel, so when a leaked fuel evaporates, the leaked fuel takes away a large amount of heat by the latent heat of vaporization. As the result, even if a small amount of fuel leaks, a decrease in the temperature of the liquefied gas fuel is caused without fail. In addition, of the fuel tank and the fuel passage, the measured values of the temperature of the fuel, which are measured at the first part and the second part which are different from each other, are compared with each other. For this reason, even if the engine is not in a steady operating state, a decrease in the temperature of the liquefied gas fuel, which is caused at the second part, can be detected. Hence, even if the engine is not in the steady operating state, the abnormality diagnosis apparatus can diagnose the fuel leak from the fuel passage with high accuracy.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a plurality of embodiments of the present disclosure will be described with reference to the drawings. In this regard, by assigning the same reference symbols to corresponding constituent elements in the respective embodiments, duplicate descriptions of the constituent elements will be omitted in some cases. In a case where only a part of a construction in each embodiment is described, the construction of the other embodiment described in advance can be applied to the other parts of the construction. Further, not only the constructions described clearly in the descriptions of the respective embodiments can be combined to each other but also, even if not described clearly, the constructions of the plurality of embodiments can be partially combined to each other if the combination does not specially cause a problem. Also a not-specified combination of the constructions described in the plurality of embodiments and modified examples shall be disclosed by the following description.

First Embodiment

Figure 1:
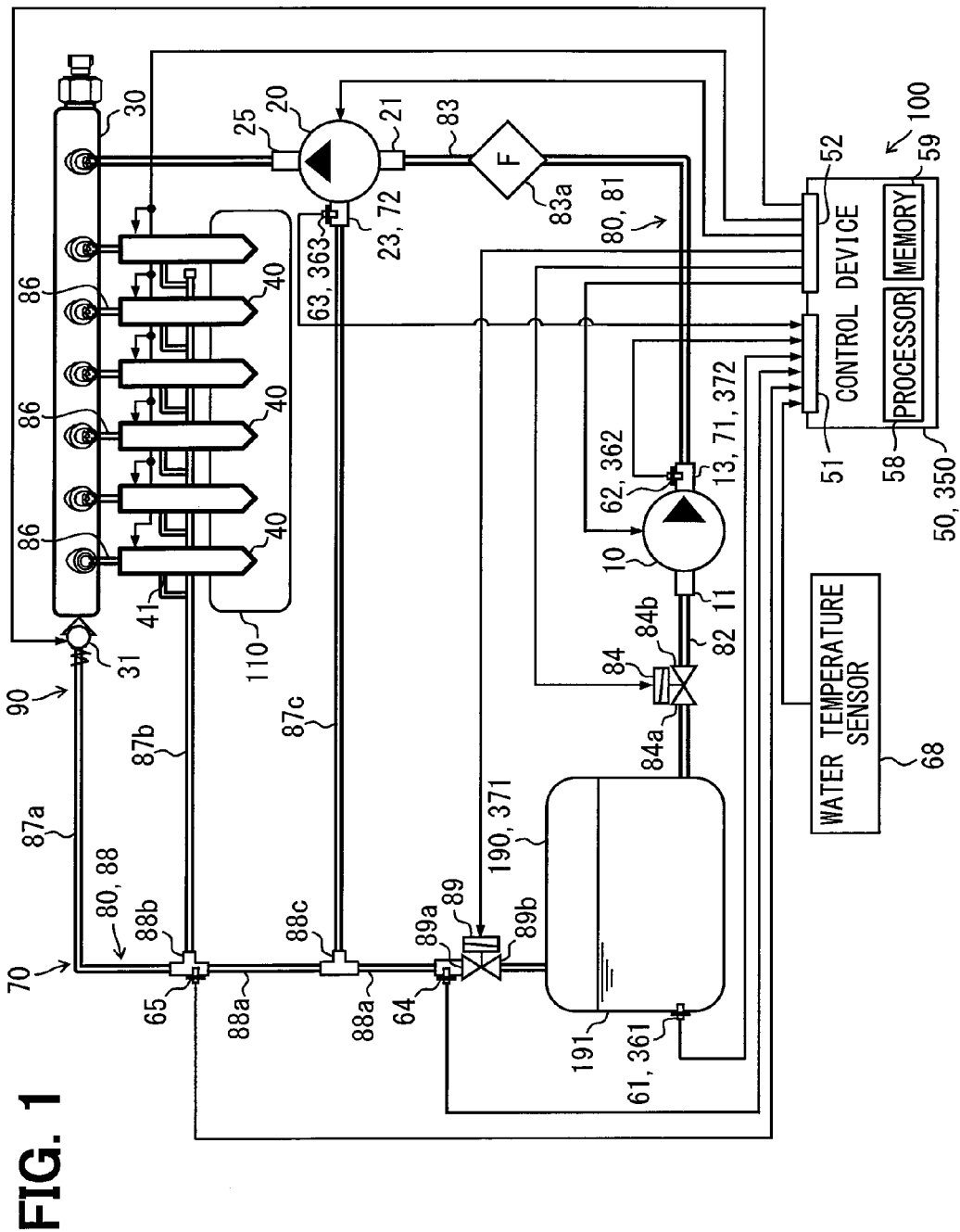
FIG. 1 is a diagram to illustrate a general configuration of an abnormality diagnosis apparatus according to a first embodiment of the present disclosure.

An abnormality diagnosis apparatus 100 shown in FIG. 1 is an apparatus that is applied to a fuel supply system 90 belonging to an internal combustion engine 110 and that diagnoses an abnormality of the fuel supply system 90. Specifically, the internal combustion engine 110 is a diesel engine and compresses fuel injected from an injector 40 arranged in each cylinder. The internal combustion engine 110 transforms the thermal energy of the fuel combusted by compression in each combustion chamber to power.

The fuel supply system 90 supplies a liquefied gas fuel stored in a fuel tank 190 to the internal combustion engine 110. In the fuel tank 190 mounted in a vehicle, dimethyl ether (DME), which is a kind of the liquefied gas fuel, is stored as fuel to be supplied to the internal combustion engine 110. The DME fuel in the fuel tank 190 is pressurized by a pressure corresponding to a fuel vapor pressure, thereby being liquefied. The fuel supply system 90 has a fuel passage 70 that circulates the liquefied gas fuel between the fuel tank 190 and the internal combustion engine 110.

The fuel passage 70 is constructed of a fuel line 80 and a feed pump 10, a supply pump 20, a common rail 30, and an injector 40, which are connected to each other by the fuel line 80.

The fuel line 80 is a piping to fluidize the DME fuel. The fuel line 80 includes a supply line 81, a high pressure line 85, a distribution line 86, and a leak fuel line 88. In addition, the supply line 81 is provided with a supply shutoff valve 84 and the leak fuel supply line 88 is provided with a return current shutoff valve 89.

The supply line 81 forms a fuel passage to supply the DME fuel to each injector 40 from the fuel tank 190. The supply line 81 is formed of a pipe made of metal. The supply line 81 has a first section 82 and a second section 83. Of the supply line 81, the first section 82 is a section to connect the fuel tank 190 to the feed pump 10. Of the supply line 81, the second section 83 is a section to connect the feed pump 10 to the supply pump 20. The second section 83 is provided with a filter 83a to remove a foreign matter mixed into the DME fuel.

Each of the high pressure line 85 and the distribution line 86 is formed of a member that is made of metal in the shape of a curved pipe. The high pressure line 85 is a pipe to connect the supply pump 20 to the common rail 30. The high pressure line 85 forms a fuel passage to supply the DME fuel, whose pressure is increased by the supply pump 20, to the common rail 30. The distribution line 86 is a pipe to connect the common rail 30 to each injector 40. Each distribution line 86 forms a fuel passage to supply the high pressure DME fuel stored in the common rail 30 to each injector 40.

The leak fuel line 88 forms a fuel passage to return the DME fuel as a leak fuel, which is not used for combustion in the internal combustion engine 110, to the fuel tank 190. The leak fuel line 88 is formed of a pipe made of metal. The leak fuel line 88 has a rail leak line 87a, an injector return line 87b, a pump leak line 87c, and a joining line 88a. The rail leak line 87a is a pipe to connect the common rail 30 to a first joining part 88b of the joining line 88a. The injector return line 87b is a pipe to connect each injector 40 to the first joining part 88b. The pump leak line 87c is a pipe to connect the supply pump 20 to a second joining part 88c of the joining line 88a. The joining line 88a is a pipe to connect the respective lines 87a to 87c to the fuel tank 190. The joining line 88a circulates the leak fuel, which is discharged to the respective lines 87a to 87c, to the fuel tank 190.

Each of the supply shutoff valve 84 and the return current shutoff valve 89 is a two-way valve constructed of a valve body, which circulates the DME fuel, and an actuator, which controls the valve body, and the like. The valve body of the supply shutoff valve 84 is provided with an inflow port part 84a and an outflow port part 84b which are respectively connected to the first section 82 of the supply line 81. The supply shutoff valve 84 switches between circulating and interrupting the DME fuel in the first section 82 on the basis of a control signal inputted to the actuator. The valve body of the return current shutoff valve 89 is provided with an inflow port part 89a and an outflow port part 89b which are respectively connected to the joining line 88a of the leak fuel line 88. The return current shutoff valve 89 switches between circulating and interrupting the DME fuel in the joining line 88a on the basis of a control signal inputted to the actuator.

The feed pump 10 is an electric pump arranged in the outside of the fuel tank 190. The feed pump 10 is provided with a suction port 11 and a discharge port 13. The suction port 11 is connected to the first section 82. The discharge port 13 is connected to the second section 83. The feed pump 10 sucks the DME fuel stored in the fuel tank 190 from the suction port 11 and applies a feed pressure (for example, 1 to 2 MPa) to the DME fuel to thereby pressure-feed the DME fuel to the supply pump 20 from the discharge port 13.

The supply pump 20 is, for example, a plunger pump and is driven by the internal combustion engine 110. The supply pump 20 is provided with a suction port 21, an overflow fuel emission port 23, and a discharge port 25. The suction port 21 is connected to the second section 83. The overflow fuel emission port 23 is connected to the pump leak line 87c. The discharge port 25 is connected to the high pressure line 85. The supply pump 20 sucks the DME fuel, which is discharged by the feed pump 10, from the suction port 21 and further pressurizes the DME fuel. The supply pump 20 pressure-feeds the DME fuel, whose pressure is increased, from the discharge port 25 to the common rail 30. In addition, the supply pump 20 emits the leak fuel leaking out through a clearance formed around a sliding portion of a plunger and the like from the overflow fuel emission port 23. The DME fuel as an overflow fuel emitted from the overflow fuel emission port 23 is returned to the fuel tank 190 through a fuel passage formed by the pump leak line 87c and the joining line 88a.

The common rail 30 is a member which is made of a metal material such as steel in the shape of a pipe. The common rail 30 accumulates the DME fuel pressurized by the supply pump 20 with the pressure of the DME fuel held. The common rail 30 supplies the DME fuel to the respective injectors 40. The common rail 30 is provided with a pressure reducing valve 31. In a case where a fuel pressure in the common rail 30 becomes higher than a specified upper limit pressure, the pressure reducing valve 31 is opened. The DME fuel as the leak fuel emitted by the pressure reducing valve 31 is returned to the fuel tank 190 through the fuel passage formed by the rail leak line 87a and the joining line 88a.

The injector 40 supplies the DME fuel supplied through the common rail 30 to the interior of each cylinder of the internal combustion engine 110. The injector 40 is inserted into a through hole formed in a head part of the internal combustion engine 110, thereby having its injection port exposed in a combustion chamber. The injector 40 injects the DME fuel from the injection port exposed in the combustion chamber on the basis of a control signal to be inputted.

The injector 40 has an excess fuel emission part 41. The excess fuel emission part 41 emits an excess fuel produced by the injector 40 to the outside of the injector 40. The excess fuel of the injector 40 is fuel which is not injected from the injection port of the DME fuel supplied from the common rail 30. Specifically, the excess fuel is fuel emitted from a back pressure chamber of the injector 40 and fuel leaking out from a clearance formed at a sliding portion of the injector 40. The DME fuel as the leak fuel emitted from the excess fuel emission part 41 is returned to the fuel tank 190 through a fuel passage formed of the injector return line 87b and the joining line 88a.

In the fuel passage 70 described above, the DME fuel flows from the fuel tank 190 through the feed pump 10, the supply pump 20, the common rail 30, and the injector 40 in this order, and a part of the DME fuel is returned to the fuel tank 190. In the supply line 81 and the like, along the direction in which the DME fuel flows, a side close to the fuel tank 190 is assumed to be an upstream side and a side close to the internal combustion engine 110 is assumed to be a downstream side. In contrast, in the leak fuel line 88, a side close to the internal combustion engine 110 is assumed to be an upstream side and a side close to the fuel tank 190 is assumed to be a downstream side. In this regard, the supply line 81 is on the more upstream side of the leak fuel line 88.

Next, the abnormality diagnosis apparatus 100 will be described in detail. The abnormality diagnosis apparatus 100 diagnoses a leak out of the DME fuel from the fuel passage 70 described above. The abnormality diagnosis apparatus 100 is provided with a tank temperature sensor 61, a low-pressure temperature sensor 62, a high-pressure temperature sensor 63, a low-temperature-return temperature sensor 64, a high-temperature-return temperature sensor 65, and a control device 50.

The tank temperature sensor 61 is a measuring part to measure a fuel temperature of the DME fuel stored in the fuel tank 190. The tank temperature sensor 61 is arranged on a wall part 191 of the fuel tank 190. A measured value measured by the tank temperature sensor 61 is acquired as a tank temperature TM by the control device 50.

The low-pressure temperature sensor 62 is a measuring part to measure a temperature of the DME fuel discharged from the discharge port 13 of the feed pump 10. The low-pressure temperature sensor 62 is arranged at the discharge port 13 of the feed pump 10. The discharge port 25 corresponds to a first part 71 in the first embodiment. A measured value measured by the low-pressure temperature sensor 62 is acquired as a low pressure line temperature LM by the control device 50. In this regard, a position in which the low-pressure temperature sensor 62 is fixed may be near the discharge port 13. For example, the low-pressure temperature sensor 62 can be fixed to, for example, an end portion of the pipe of the second section 83 connected to the discharge port 13.

The high-pressure temperature sensor 63 is a measuring part to measure a temperature of the DME fuel emitted from the overflow fuel emission port 23 of the supply pump 20. The high-pressure temperature sensor 63 is arranged at the overflow fuel emission port 23 of the supply pump 20. The overflow fuel emission port 23 corresponds to a second part 72 in the first embodiment. The overflow fuel emission port 23 is positioned on the more downstream side in the direction in which the DME fuel flows than the discharge port 25 as the first part 71 of the fuel passage 70. The DME fuel emitted from the overflow fuel emission port 23 is emitted from the supply pump 20 without being pressurized to the pressure of the DME fuel pressure-fed from the discharge port 25. A measured value measured by the high-pressure temperature sensor 63 is acquired as a high pressure line temperature HM by the control device 50.

In this regard, a position in which the high-pressure temperature sensor 63 is fixed may be near the overflow fuel emission port 23. For example, the high-pressure temperature sensor 63 can be fixed to, for example, an end portion of the pump leak line 87c connected to the overflow fuel emission port 23.

The low-temperature-return temperature sensor 64 is a measuring part to measure a temperature of the DME fuel flowing into the inflow port part 89a. The low-temperature-return temperature sensor 64 is arranged at an end portion of the joining line 88a connected to the inflow port 89a of the return current shutoff valve 89. A measured value measured by the low-temperature-return temperature sensor 64 is acquired as a return temperature RM by the control device 50.

The high-temperature-return temperature sensor 65 is a measuring part to measure a temperature of a leak fuel emitted from the common rail 30 and the respective injectors 40, that is, a temperature of the DME fuel heated by the internal combustion engine 110. The high-temperature-return temperature sensor 65 is arranged on the upstream side closer to the internal combustion engine 110 than the inflow port part 89a of the leak fuel line 88. Specifically, the high-temperature-return temperature sensor 65 is fixed to the first joining part 88b. The high-temperature-return temperature sensor 65 is positioned at a high temperature position in which the rail leak line 87a and the injector return line 87b join each other. A measured value measured by the high-temperature-return temperature sensor 65 is acquired as a high-temperature-return temperature HRM by the control device 50.

The control device 50 is so constructed as to include a microcomputer and a drive circuit, the microcomputer having a processor 58 as an operation circuit, an RAM, and a flash memory 59 as a rewritable non-volatile storage medium. The control device 50 has an input part 51 and an output part 52. The input part 51 is connected to many sensors mounted in the vehicle, specifically, the respective temperature sensors 61 to 65 and a water temperature sensor 68 to measure a cooling water temperature of the internal combustion engine 110. The output part 52 is connected to the feed pump 10, the supply pump 10, the pressure reducing valve 31, the respective injectors 40, and the respective actuators of the supply shutoff valve 84 and the return current shutoff valve 89. The control device 50 generates the control signal to be outputted from the output part 52 on the basis of a control program stored in the flash memory 59 and respective information acquired through the input part 51.

In the abnormality diagnosis apparatus 100 described above, processing performed by the processor 58 of the control device 50 so as to diagnose a leak of the liquefied gas fuel from the fuel passage 70 will be described. In the processing performed by the control device 50 are used four threshold values of a low-pressure-threshold temperature LT, a high-pressure-threshold temperature HT, a low-temperature-return-threshold temperature RT1, and a high-temperature-return-threshold temperature RT2. First, a correlation between these threshold values and respective measured values of the respective temperature sensors 61 to 65 will be described with reference to FIG. 1 on the basis of the FIG. 2.

Figure 2:
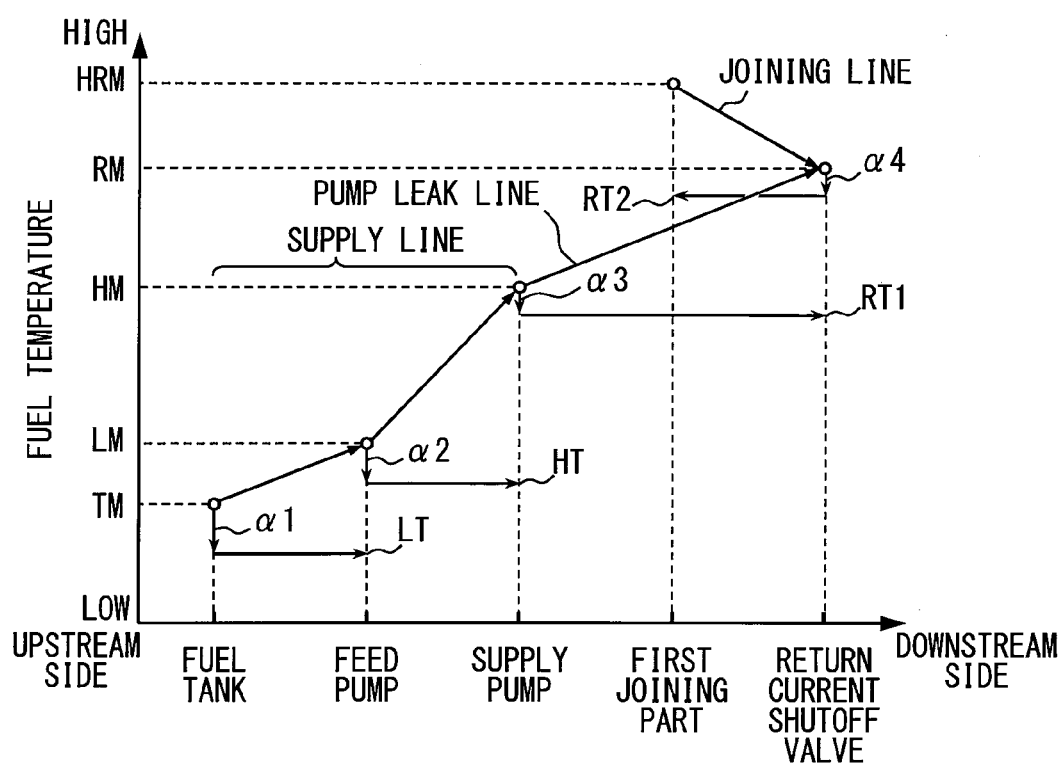
FIG. 2 is a graph to show a correlation between a measured value of each temperature sensor and each threshold temperature.

In FIG. 2, a correlation of the temperature of the DME fuel at the respective measuring points is shown. The temperature of the DME fuel in the supply line 81 is increased along with the pressure being increased toward the upstream side from the fuel tank 190 to the internal combustion engine 110. In contrast, the temperature of the DME fuel in the joining line 88a is decreased toward the downstream side from the internal combustion engine 110 to the fuel tank 190.

Figure 4:
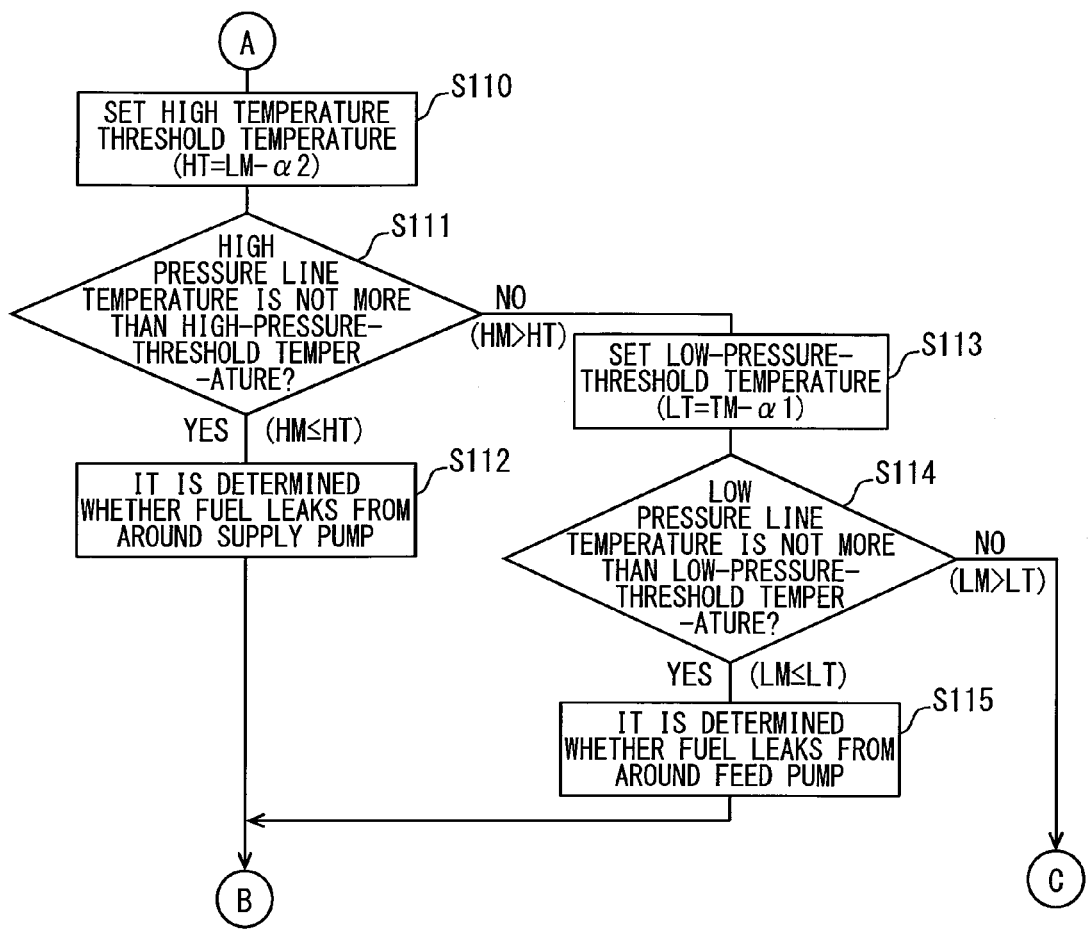
FIG. 4 is a flow chart to show the processing performed by the processor of the control device of the first embodiment.

The low-pressure-threshold temperature LT is a value used for comparison with the low pressure line temperature LM (see S114 in FIG. 4). The low-pressure-threshold temperature LT is set at a lower temperature than the tank temperature TM. Specifically, the low-pressure-threshold temperature LT is set at a value lower than the tank temperature TM by an allowance $\alpha 1$.

The high-pressure-threshold temperature HT is a value used for comparison with the high pressure line temperature HM (see S111 in FIG. 4). The high-pressure-threshold temperature HT is set at a lower temperature than the low pressure line temperature LM. Specifically, the high-pressure-threshold temperature HT is set at a value lower than the low pressure line temperature LM by an allowance $\alpha 2$. The allowance $\alpha 1$ of a difference between the tank temperature TM and the low-pressure-threshold temperature LT is made a value larger than the allowance $\alpha 2$ of a difference between the low pressure line temperature LM and the high-pressure-threshold temperature HT.

Figure 3:
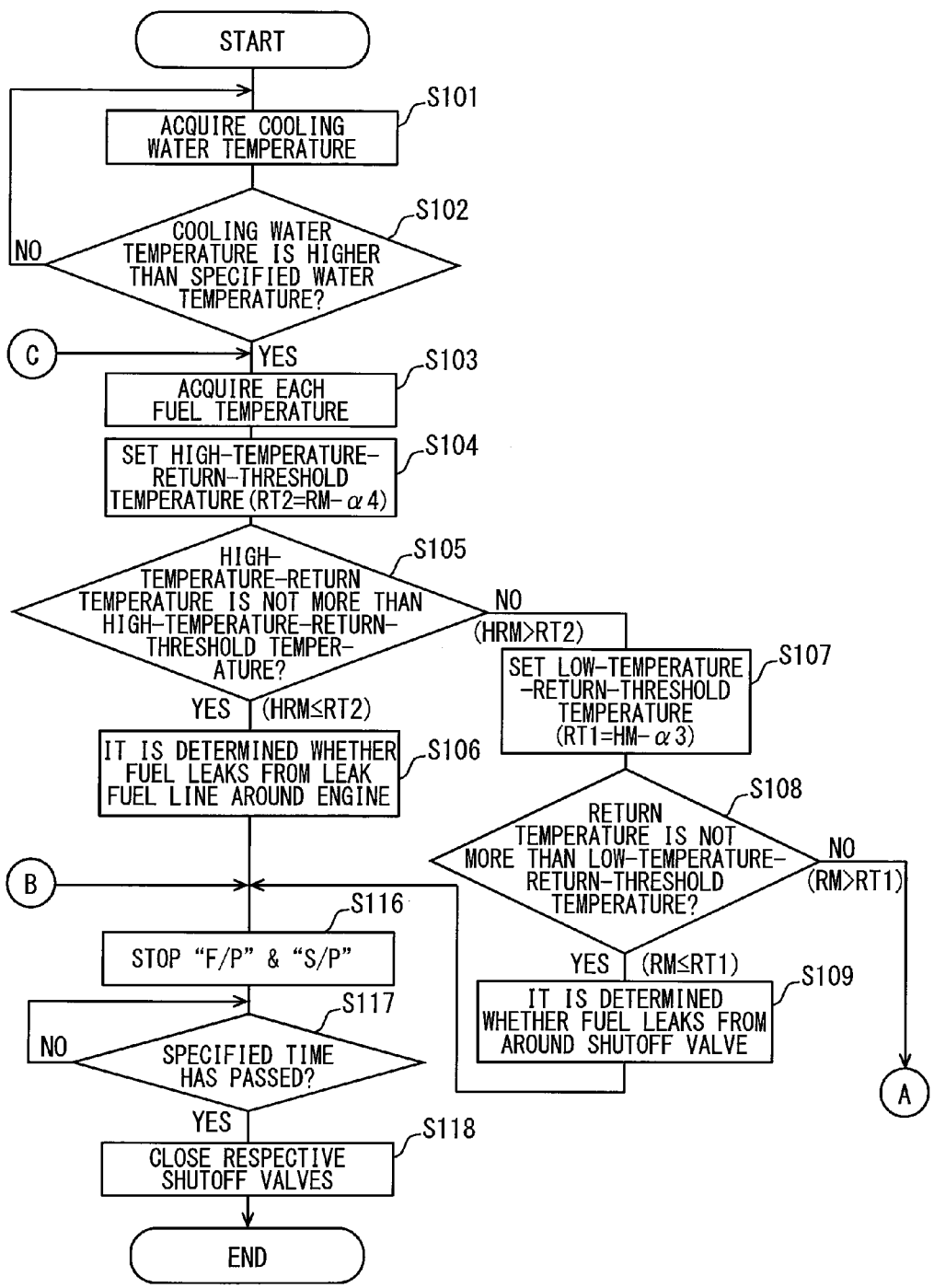
FIG. 3 is a flow chart to show processing performed by a processor of a control device of the first embodiment.

The low-temperature-return-threshold temperature RT1 is a value used for comparison with the return temperature RM (see S108 in FIG. 3). The low-temperature-return-threshold temperature RT1 is set at a lower temperature than the high pressure line temperature HM. Specifically, the low-temperature-return-threshold temperature RT1 is set at a value lower than the high pressure line temperature HM by an allowance $\alpha 3$. Each of the allowances $\alpha 1$ and $\alpha 1$ described above is made a value larger than the allowance $\alpha 3$ of a difference between the high pressure line temperature HM and the low-temperature-return-threshold temperature RT1.

The high-temperature-return-threshold temperature RT2 is a value used for comparison with the high-temperature-return temperature HRM (see S105 in FIG. 3). The high-temperature-return-threshold temperature RT2 is set at a lower temperature than the return temperature RM. Specifically, the high-temperature-return-threshold temperature RT2 is set at a value lower than the return temperature RM by an allowance $\alpha 4$. The allowance $\alpha 4$ of a difference between the return temperature RM and the high-temperature-return-threshold temperature RT2 is made a value which is as large as or a little smaller than the allowance $\alpha 3$ described above.

Next, processing performed by the control device 50 by using the respective threshold values described above will described in detail with reference to FIG. 1 on the basis of FIG. 3 and FIG. 4. Processing shown in FIG. 3 and FIG. 4 is started by the control device 50, for example, on the basis of an operation for turning on an ignition of a vehicle being inputted to the control device 50. In a case where the control device 50 does not detect a fuel leak, the control device 50 continuously performs the following processing until an operation of turning off the ignition is inputted to the control device 50.

In S101, a measured value of a cooling water temperature of the internal combustion engine 110 is acquired from the cooling water sensor 68 and then the routine proceeds to S102. In S102, it is determined whether or not the cooling water temperature acquired in S101 is higher than a specified water temperature. It is checked by the determination of S102 that warming up the internal combustion engine 110 is finished. In a case where it is determined in S102 that the cooling water temperature is not more than the specified water temperature, it is determined that the internal combustion engine 110 is being warmed up and then the routine again returns to S101. By repeating the processing of S101 and S102, a waiting state is held until warming up the internal combustion engine 110 is finished.

In S103 after warming up the internal combustion engine 110 being finished, the measured values of the DME fuel are acquired from the respective temperature sensors 61 to 65 and then the routine proceeds to S104. In S104, the high-temperature-return-threshold temperature RT2 is set on the basis of the return temperature RM acquired in S103 and then the routine proceeds to S105. In S105, a decrease in the temperature of the DME fuel in the first joining part 88b is detected on the basis of a comparison between the high-temperature-return temperature HRM acquired in S103 and the high-temperature-return-threshold temperature RT2 based on the return temperature RM. In a case where it is detected in S105 that the high-temperature-return temperature HRM is not more than the high-temperature-return-threshold temperature RT2, the routine proceeds to S106. In S106, it is determined that a fuel leak is caused in a section from the inflow port part 89a to the internal combustion engine 110 of the leak fuel line 88, virtually, in the rail leak line 87a and the injector return line 87b around the internal combustion engine 110, and then the routine proceeds to S116.

In S107 based on a negative determination in S105, the low-temperature-return-threshold temperature RT1 is set on the basis of the high temperature line temperature HM acquired in S103, and then the routine proceeds to S108. In S108, it is detected on the basis of a comparison between the return temperature RM acquired in S103 and the low-temperature-return-threshold temperature RT1 based on the high pressure line temperature HM that the temperature of the DME fuel in the inflow port 89a is decreased. In a case where it is detected in S108 that the return temperature RM is not more than the low-temperature-return-threshold temperature RT1, the routine proceeds to S109. In S109, it is determined that a fuel leak is caused in a section from the overflow fuel emission port 23 to the inflow port part 89a of the leak fuel line 88, virtually, from around the return current shutoff valve 89, and then the routine proceeds to S116.

In S110 based on a negative determination in S108, the high-pressure-threshold temperature HT is set on the basis of the low pressure line temperature LM acquired in S103, and then the routine proceeds to S111. In S111, it is detected on the basis of a comparison between the high pressure line temperature HM acquired in S103 and the high-pressure-threshold temperature HT based on the low pressure line temperature LM that the temperature of the DME fuel in the overflow fuel emission port 23 is decreased. In a case where it is detected in S111 that the high pressure line temperature HM is not more than the high-pressure-threshold temperature HT, the routine proceeds to S112. In S112, it is determined that a fuel leak is caused in a section from the discharge port 13 to the overflow fuel emission port 23 of the fuel passage 70, virtually, from around the supply pump 20, and then the routine proceeds to S116.

In S113 based on a negative determination of S111, the low-pressure-threshold temperature LT is set on the basis of the tank temperature TM acquired in S103, and then the routine proceeds to S114. It is detected in S114 on the basis of a comparison between the low pressure line temperature LM acquired in S103 and the low-pressure-threshold temperature LT based on the tank temperature TM that the temperature of the DME fuel at the discharge port 13 is decreased. In a case where it is detected in S114 that the low pressure line temperature LM is not more than the low-pressure-threshold temperature LT, the routine proceeds to S115. In S115, it is determined that a fuel leak is caused in the section from the fuel tank 190 to the discharge port 13, virtually, from around the feed pump 10, and then the routine proceeds to S116. In contrast, in a case where a negative determination is made in S114, the routine again returns to S103, and the processing of S104 to S115 for detecting a fuel leak are repeated.

In S116 in a case where it is determined that the fuel leak is caused in some part, in order to stop circulating the DME fuel in the fuel passage 70, a control signal to stop circulating the DME fuel is outputted to the feed pump 10 and the supply pump 20, and then the routine proceeds to S117. In S117, in order to wait for the DME fuel circulating through the fuel passage 70 to finish circulating, it is determined whether or not a specified time passes from the time when the pumps 10, 20 are stopped. In a case where it is determined in S117 that the specified time does not pass from the time when the pumps 10, 20 are stopped, determination processing is repeatedly performed, whereby a waiting state is held until the specified time passes from the time when the pumps 10, 20 are stopped. Then, in a case where the specified time passes from the time when the pumps 10, 20 are stopped, the routine proceeds to S118.

In S118, a control signal for instructing a valve to open is outputted to the respective actuators of the supply shutoff valve 84 and the return current shutoff valve 89, whereby a series of processing are finished. When the respective shut-off valves 84, 89 are closed on the basis of the control signals described above, the DME fuel stored in the fuel tank 190 can be prevented from further leaking to the outside.

In the abnormality diagnosis apparatus 100 according to the first embodiment described above, liquid flowing through the fuel passage 70 is the liquefied DME fuel, so that the fuel leaking out from the fuel passage 70 is vaporized to thereby take away a large amount of heat by the latent heat of vaporization. As the result, even if a small amount of fuel leaks out, the temperature of the DME fuel circulating through the fuel passage 70 is decreased without fail. In addition, according to a construction in which the measured values of the fuel temperature measured at different positions are compared with each other, for example, even if the internal combustion engine 110 is in a transient state, a decrease in the temperature of the DME fuel can be detected without fail. Hence, even if the internal combustion engine 110 is not in a steady driving state, the abnormality diagnosis apparatus 100 can diagnose the fuel leak from the fuel passage 70 with high accuracy.

Here, the fuel leak from the fuel passage 70 is easily caused in connection portions in which the respective fuel lines 80 are connected to the respective pumps 10, 20 and the return current shutoff valve 89, and in the respective pumps 10, 20 and the return current shutoff valve 89 themselves, which are movably constructed. In addition, also the rail leak line 87a and the injector return line 87b in which the DME fuel of high temperature and high pressure is circulated are portions in which the fuel leak is likely to be caused. Hence, in the first embodiment, there are separately provided the temperature sensors 61 to 65 for detecting the fuel leak from the feed pump 10, the supply pump 20, the return current shutoff valve 89, and the respective leak lines 87a, 87b. As the result, the abnormality diagnosis apparatus 100 not only can detect the fuel leak being caused from the fuel passage 70 but also can determine a position in which the fuel leak is caused in the fuel passage 70.

In addition, the higher the pressure of the circulating DME fuel is, the higher the risk of the fuel leak becomes. Hence, the abnormality diagnosis apparatus 100 according to the first embodiment determines whether or not the fuel leak is caused in order from the surroundings of the internal combustion engine 110 in which the DME fuel becomes high in temperature and pressure to the surroundings of the feed pump 10 in which the DME fuel becomes low in temperature and pressure. According to the processing described above, the fuel leak from the fuel passage 70 can be diagnosed quickly and effectively.

Further, in the first embodiment, the measured values of the respective temperature sensors 61 to 65 are not directly compared with each other but the respective threshold temperatures LT, HT, RT1, and RT2, which are acquired by subtracting the allowances $\alpha 1$ to $\alpha 4$ from the respective measured values, are used. Hence, even in a case where the measured value is accidentally decreased by a factor different from the fuel leak, for example, by an external factor such as a change in flow rate when the internal combustion engine 110 is in the transient state or the internal combustion engine 110 being watered while the vehicle is running, it is possible to prevent an erroneous determination from being made. Hence, in the abnormality diagnosis apparatus 100 that diagnoses the leak of the DME fuel on the basis of the fuel temperature, it is especially effective for avoiding an erroneous determination to use the respective threshold temperatures LT, HT, RT1, and RT2.

Further, in the first embodiment, a temperature difference between the fuel tank 190 and the feed pump 10 is smaller than a temperature difference between the feed pump 10 and the supply pump 20 (see FIG. 2). Hence, the allowance $\alpha 1$ used to set the low-pressure-threshold temperature LT is made larger than the allowance $\alpha 2$ used to set the high-pressure-threshold temperature HT. By setting the allowances $\alpha 1$ and $\alpha 2$ in this manner, an erroneous determination caused by an accidental decrease in the low pressure line temperature LM can be prevented. As described above, a construction in which as the temperature difference between positions in which the measured values of the fuel temperatures are compared becomes smaller, the allowances at the positions are set at larger values is effective for both of preventing the erroneous determination and improving the accuracy of the diagnosis.

In addition, the abnormality diagnosis apparatus 100 according to the first embodiment compares two measured values of the temperature sensors arranged next to each other in the fuel passage 70 of the plurality of temperature sensors 61 to 65 and determines the fuel leak near the temperature sensor positioned on the downstream side. In the construction described above, the two temperature sensors whose measured values are compared with each other measure the temperature of the DME fuel at comparatively close positions in the fuel passage 70. Hence, even if the internal combustion engine 110 is in the transient state, the measured values of the two temperature sensors can be changed with a strong relationship held between them. As the result, even if the internal combustion engine 110 is not in the steady state, the abnormality diagnosis apparatus 100 can diagnose the fuel leak with high accuracy while avoiding an erroneous determination.

In this regard, in the first embodiment, the feed pump 10 corresponds to "a low pressure pump", and the supply pump 20 corresponds to "a high pressure pump", and the overflow fuel emission port 23 corresponds to "a discharge port". Further, the control device 50 corresponds to "a determination part", and the tank temperature sensor 61 corresponds to "a tank measuring part", and the low-pressure temperature sensor 62 corresponds to "a first measuring part. Still further, the high-pressure temperature sensor 63 corresponds to "a second measuring part", and the low-temperature-return temperature sensor 64 corresponds to "a third measuring part, and the high-temperature-return temperature sensor 65 corresponds to "a fourth measuring part. Still further, the first joining part 88*b* corresponds to "a high temperature part", and the return current shutoff valve 89 corresponds to "a shutoff valve", and the inflow port part 89*a* corresponds to "an inflow port.

Second Embodiment

Figure 5:
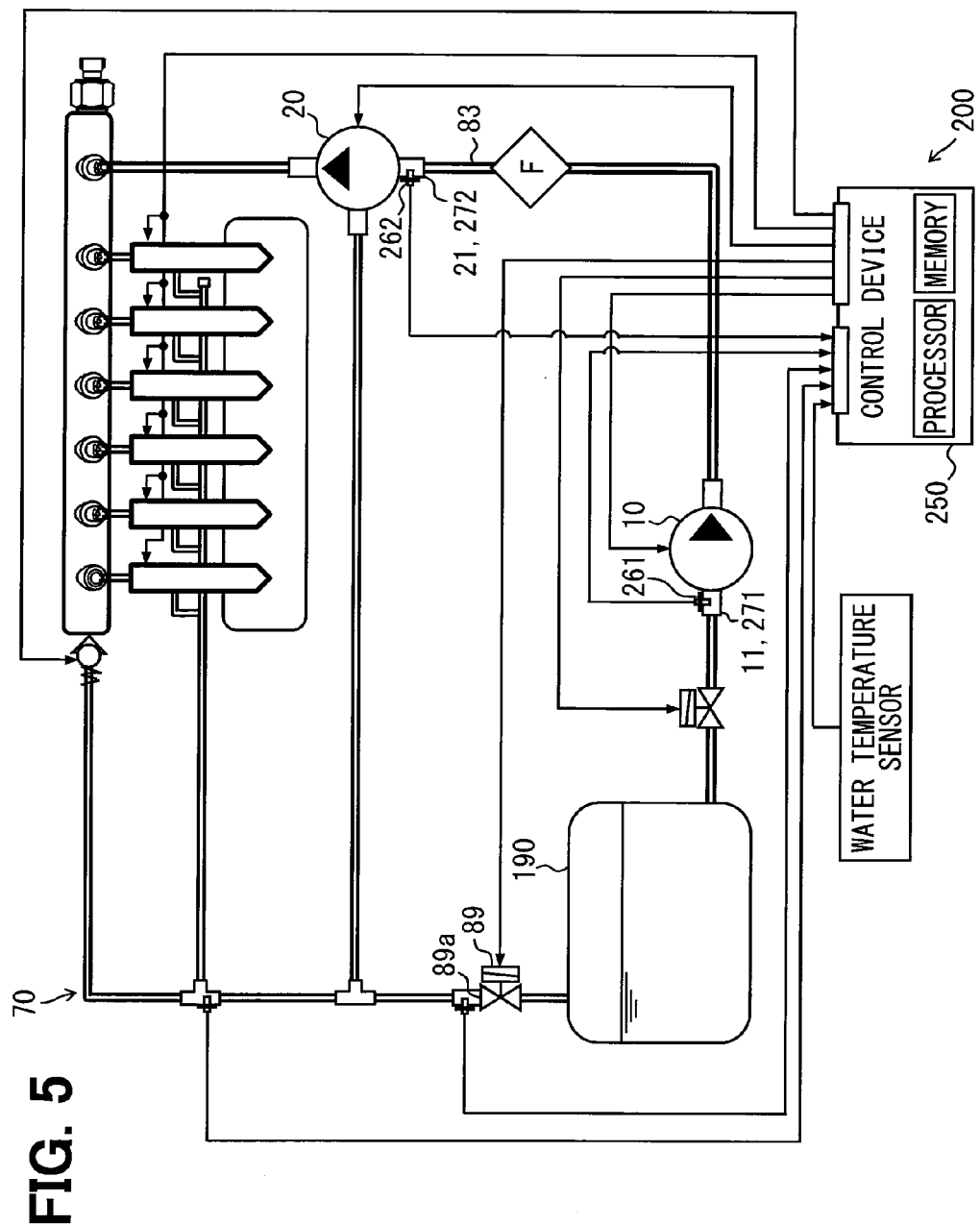
FIG. 5 is a diagram to illustrate a general configuration of an abnormality diagnosis apparatus according to a second embodiment of the present disclosure.

A second embodiment of the present disclosure shown in FIG. 5 is a modified example of the first embodiment. An abnormality diagnosis apparatus 200 according to the second embodiment is provided with a first suction temperature sensor 261 and a second suction temperature sensor 262 in place of the respective temperature sensors 61 to 63 of the first embodiment (see FIG. 1).

The first suction temperature sensor 261 is a measuring part to measure the temperature of the DME fuel sucked by the feed pump 10. The first suction temperature sensor 261 is set at a suction port 11 of the feed pump 10. The suction port 11 corresponds to a first part 271 in the second embodiment. The temperature of the DME fuel sucked in the suction port 11 is nearly equal to the temperature of the DME fuel stored in the fuel tank 190. Hence, a measured value measured by the first suction temperature sensor 261 is acquired as a tank temperature TM by a control device 250.

The second suction temperature sensor 262 is a measuring part to measure the temperature of the DME fuel sucked by the supply pump 20. The second suction temperature sensor 262 is set at a suction port 21 of the supply pump 20. The suction port 21 corresponds to a second part 272 in the second embodiment. The second suction temperature sensor 262, as is the case with the low-pressure temperature sensor 62 of the first embodiment (see FIG. 1), measures the temperature of the DME fuel flowing in the second section 83. Hence, a measured value measured by the second suction temperature sensor 262 is acquired as a low pressure line temperature LM by the control device 250.

Figure 6:
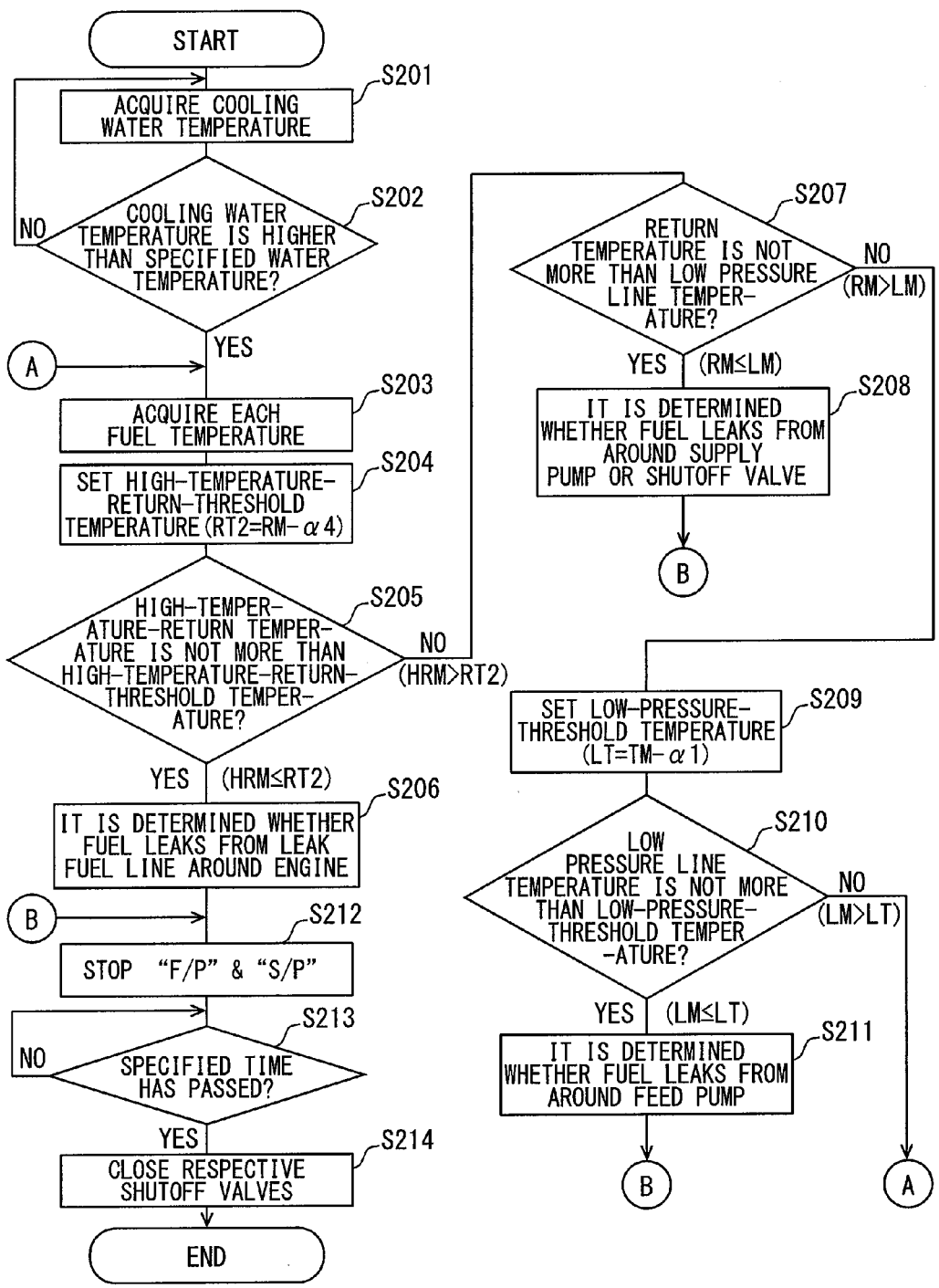
FIG. 6 is a flow chart to show processing performed by a processor of a control device of the second embodiment.

Next, processing performed by the control device 250 of the second embodiment will be described on the basis of FIG. 6 with reference to FIG. 5. In this regard, the processing of S201 to S206 and S209 to S214 shown in FIG. 6 are virtually equal to the processing of S101 to S106 and S113 to S118 of the first embodiment, respectively (see FIG. 3 and FIG. 4). Hence, the detailed descriptions of the processing will be omitted.

In S207, a decrease in the temperature of the DME fuel in the inflow port part 89*a* is detected on the basis of a comparison between the return temperature RM and the low pressure line temperature LM which are acquired in S203. In a case where it is detected that the return temperature RM is not more than the low pressure lime temperature LM, the routine proceeds to S208. In S208, it is determined that a fuel leak is caused in a section from the suction port 21 of the supply pump 20 to the inflow port part 89*a*, virtually, in some portion in the surroundings of the supply pump 20 and in the surroundings of the return current shutoff valve 89 and then the routine proceeds to S212.

Also the abnormality diagnosis apparatus 200 according to the second embodiment described above can produce the same effect as the first embodiment and hence can diagnose the fuel leak from the fuel passage 70 with high accuracy. In this regard, in the second embodiment, the suction port 11 corresponds to "a low pressure suction port", and the suction port 21 corresponds to "a high pressure suction port", and the control device 250 corresponds to "a determination part". Further, the first suction temperature sensor 261 corresponds to "the first measuring part", and the second suction temperature sensor 262 corresponds to "the second measuring part".

Third Embodiment

A third embodiment of the present disclosure is another modified example of the first embodiment. A control device 350 of the third embodiment shown in FIG. 1 is connected to a tank temperature sensor 361, a low-pressure temperature sensor 362, and a high-pressure temperature sensor 363 which are virtually equal to the respective temperature sensors 61 to 63 of the first embodiment. In the third embodiment, a fuel tank 190 in which the tank temperature sensor 361 is arranged corresponds to a first part 371, and a discharge port 13 in which the low-pressure temperature sensor 362 is arranged corresponds to a second part 372.

Figure 7:
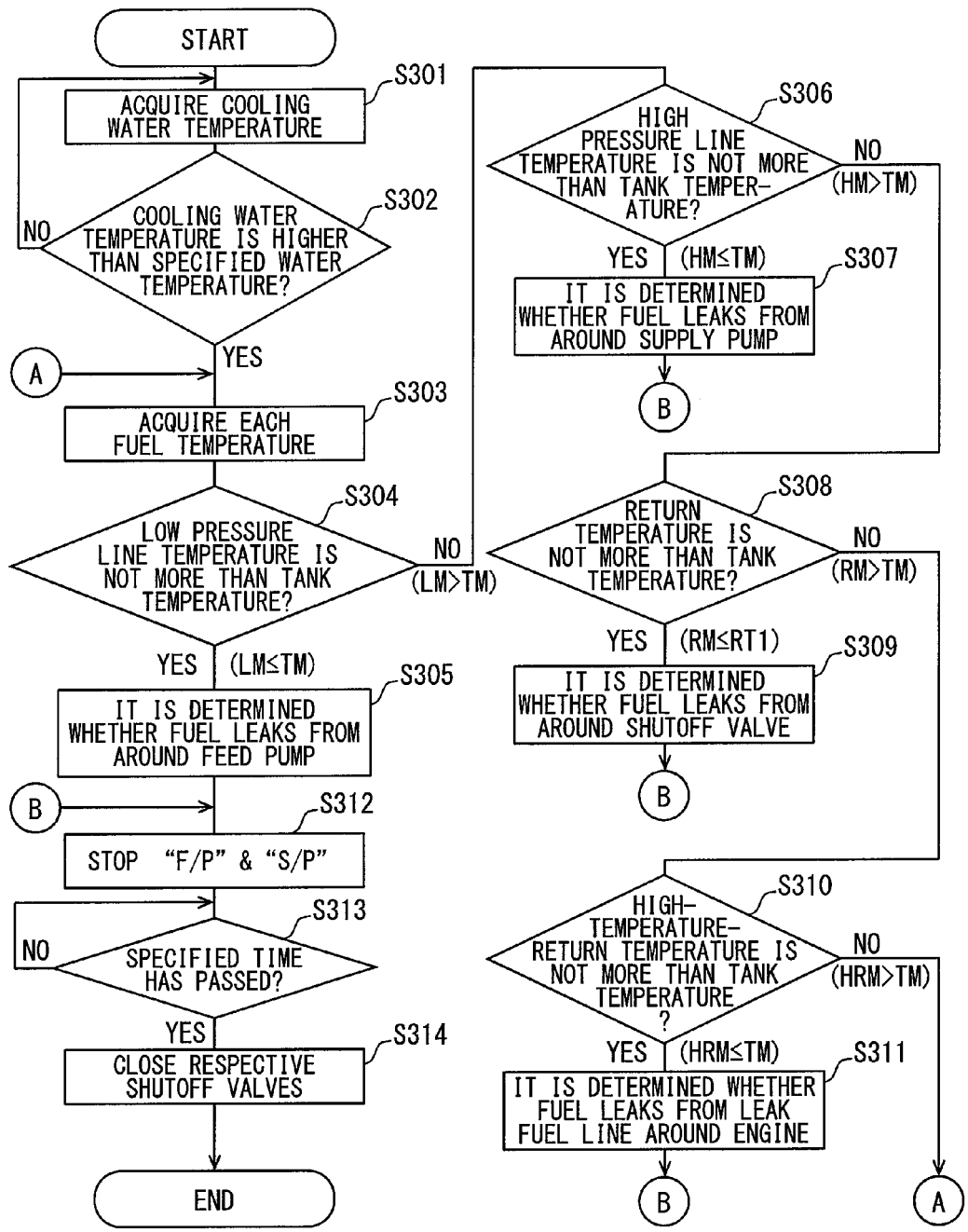
FIG. 7 is a flow chart to show processing performed by a processor of a control device of a third embodiment.

A determination of a fuel leak by the control device 350 is made in order from a low temperature and low pressure part to a high temperature and high pressure part in the fuel passage 70. Further, all of the measured values of the respective temperature sensors 362, 363, 64, and 65 are compared with the tank temperature TM. Processing performed by the control device 350 will be described in detail with reference to FIG. 1 on the basis of FIG. 7. In this regard, the processing of S301 to S303 and S312 to S314 shown in FIG. 7 are virtually equal to the processing of S101 to S103 and S116 to S118 in the first embodiment, respectively (see FIG. 3 and FIG. 4). Hence, the detailed descriptions of the processing will be omitted.

In S304, a decrease in the temperature of the DME fuel at the discharge port 13 is detected on the basis of a comparison between the low pressure line temperature LM and the tank temperature TM which are acquired in S303. In a case where it is detected that the low pressure line temperature LM is not more than the tank temperature TM, the routine proceeds to S305. In S305, it is determined that a fuel leak is caused in a section from the fuel tank to the discharge port 13, virtually, in the surroundings of the feed pump 10, and then the routine proceeds to S312.

In S306 based on a negative determination in S304, a decrease in the temperature of the DME fuel at the overflow fuel emission port 23 is detected on the basis of a comparison between the high pressure line temperature HM and the tank temperature TM which are acquired in S303. In a case where it is detected in S306 that the high pressure temperature HM is not more than the tank temperature TM, the routine proceeds to S307. In S307, it is determined that a fuel leak is caused in a section from the discharge port 13 of the feed pump 10 to the overflow fuel emission port 23 of the supply pump 20, virtually, in the surroundings of the supply pump 20, and then the routine proceeds to S312.

In S308 based on a negative determination in S306, a decrease in the temperature of the DME fuel at the inflow port part 89a is detected on the basis of a comparison between the return temperature RM and the tank temperature TM which are acquired in S303. In a case where it is detected in S308 that the return temperature RM is not more than the tank temperature TM, the routine proceeds to S309. In S309, it is determined that a fuel leak is caused in the surroundings of the return current shutoff valve 89, and then the routine proceeds to S312.

In S310 based on a negative determination in S308, a decrease in the temperature of the DME fuel at the first joining part 88b is detected on the basis of a comparison between the high-temperature-return temperature HRM and the tank temperature TM which are acquired in S303. In a case where it is detected in S310 that the high-temperature-return temperature HRM is not more than the tank temperature TM, the routine proceeds to S311. In S311, it is determined that a fuel leak is caused in the rail leak line 87a and the injector return line 87b in the surroundings of the internal combustion engine 110, and then the routine proceeds to S312.

Also the third embodiment described above can produce the same effect as the first embodiment and hence can diagnose the fuel leak from the fuel passage 70 with high accuracy. In addition, in the third embodiment, the tank temperature TM is made a reference value of the fuel temperature and is compared with the other measured values. The temperature of the DME fuel stored in the fuel tank 190 is more stable than the temperature of the DME fuel flowing in the fuel passage 70. Hence, the construction in which the tank temperature is made the reference value can make it difficult for an erroneous determination to be made.

In this regard, in the third embodiment, the control device 350 corresponds to "the determination part", and the tank temperature sensor 361 corresponds to "the first measuring part". Further, the low-pressure temperature sensor 362 corresponds to "the second measuring part", and the high-pressure temperature sensor 363 corresponds to "the third measuring part".

Other Embodiments

Up to this point, a plurality of embodiments according to the present disclosure have been described. However, the present disclosure should not be understood limitedly to the embodiments described above but can be applied to various embodiments and combinations within a scope not departing from the gist of the present disclosure.

Figure 8:
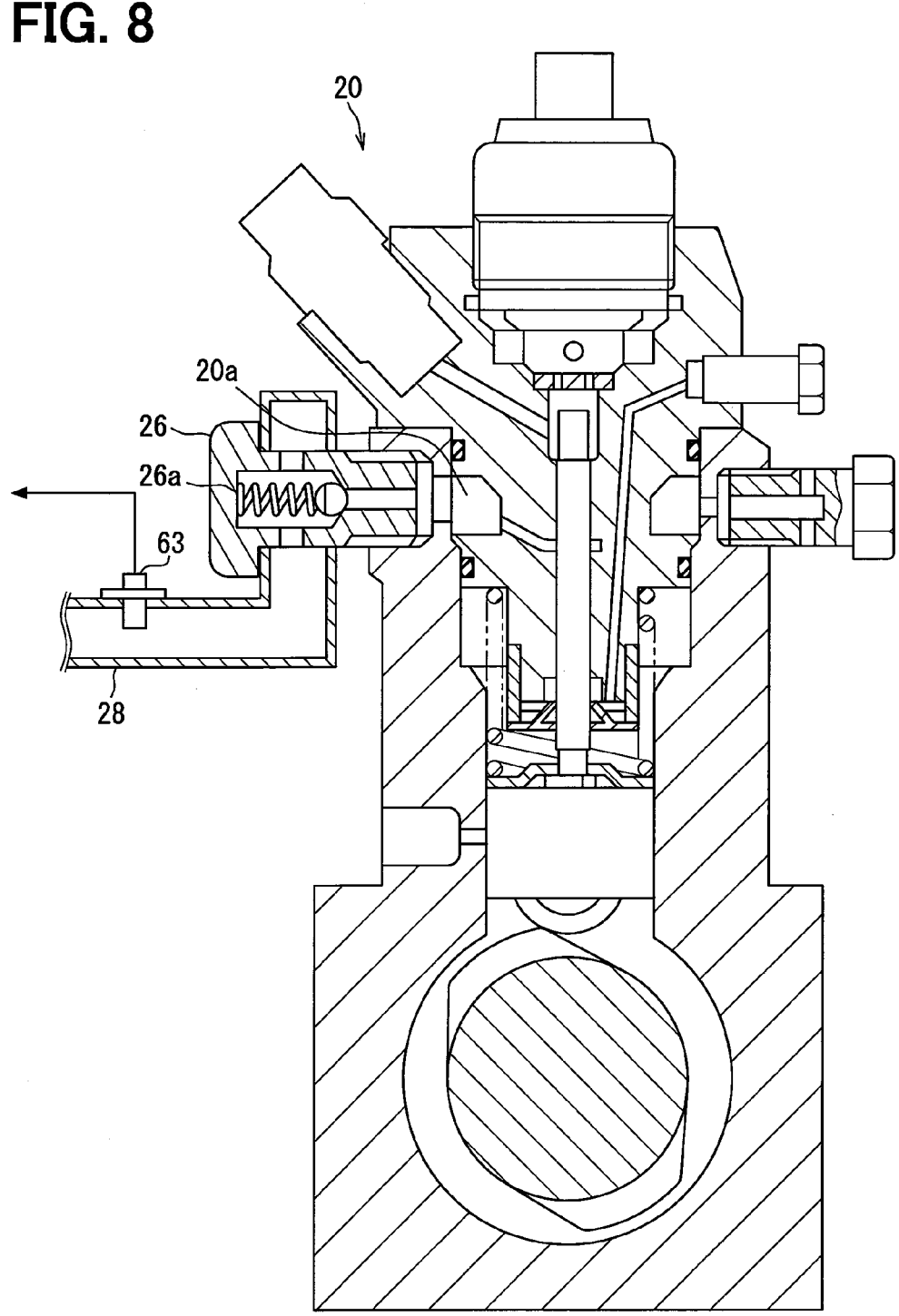
FIG. 8 is an illustration to illustrate an example in which a high-pressure temperature sensor is arranged in a supply pump.

The high-pressure temperature sensor 63 in the first embodiment described above, for example, as shown in FIG. 8, is fixed to a connection member 28 of the supply pump 20. The connection member 28 is connected to an exit side hollow screw 26. In the exit side hollow screw 26 is formed a fuel passage in which a pressure regulating valve 26a is received. When the pressure regulating valve 26a is opened, the pressure regulating valve 26a emits the DME fuel flowing into a fuel gallery 20a to the connection member 28. The connection member 28 is connected to an end portion of the pump leak line 87c of the leak fuel line 88 (see FIG. 1). According to the construction described above, the high-pressure temperature sensor 63 can measure the temperature of the DME fuel as a leak fuel (excess fuel) emitted to the fuel passage in the connection member 28.

The second suction temperature sensor 262 in the second embodiment described above, for example as shown in FIG. 9, is fixed to a connection member 29 of the supply pump 20. The connection member 29 is connected to an inlet side hollow screw 27. In the inlet side hollow screw 27 is formed a fuel passage communicating with a fuel gallery 20a. The connection member 29 is connected to an end portion of the second section 83 (see FIG. 1) of the supply line 81. According to the construction described above, the second suction temperature sensor 262 can measure the temperature of the DME fuel flowing in the fuel passage in the connection member 29.

Figure 10:
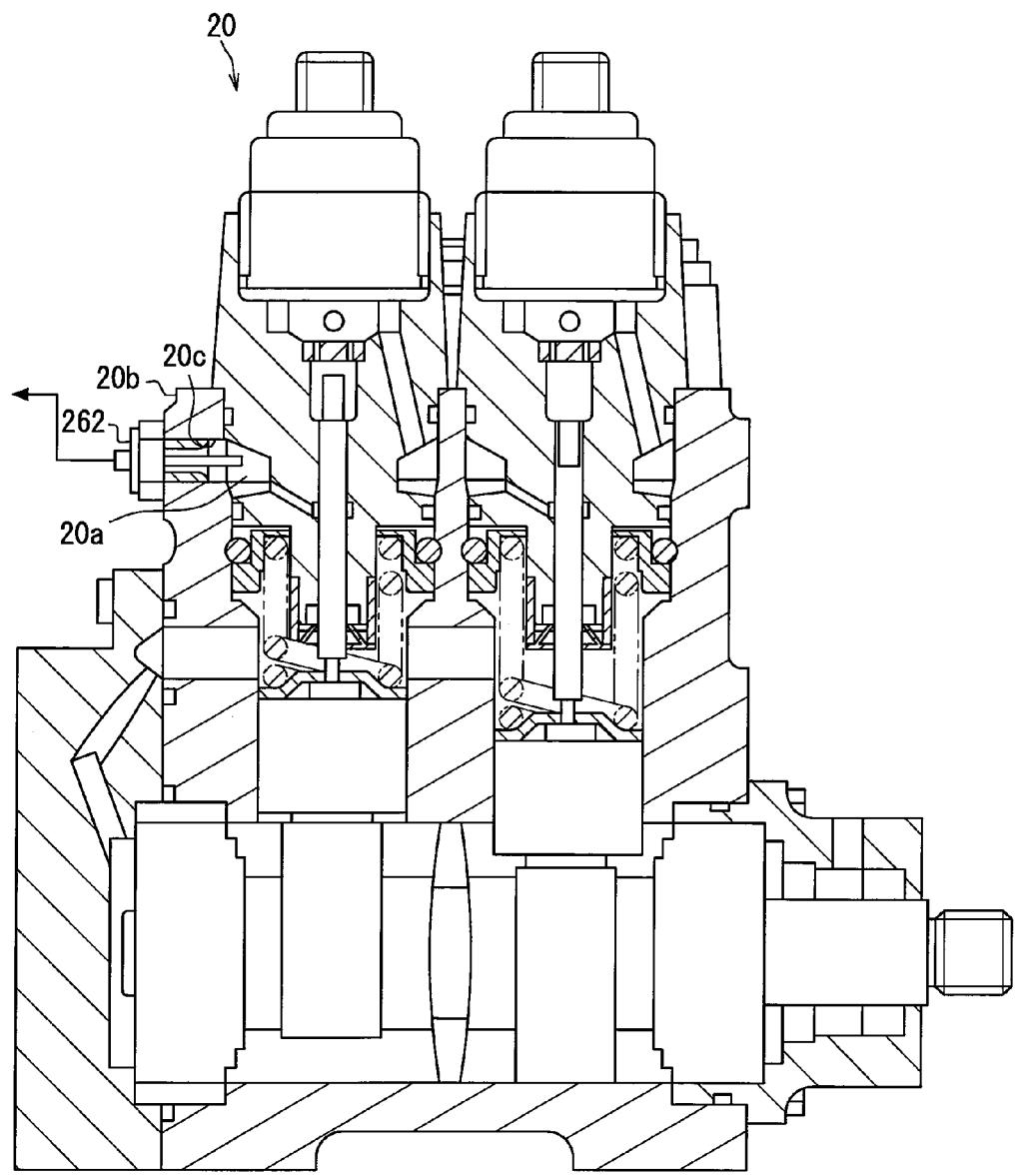
FIG. 10 is an illustration to illustrate an example in which a second suction temperature sensor is arranged in a supply pump.

Further, the second suction temperature sensor 262, for example as shown in FIG. 10, can be fixed to a housing 20b of the supply pump 20. The second suction temperature sensor 262 is inserted into an insertion hole 20c formed in the housing 20b. The insertion hole 20c makes the outside of the housing 20b communicate with the fuel gallery 20a. According to the construction described above, the second suction temperature sensor 262 can measure the temperature of the DME fuel flowing in the fuel gallery 20a.

Figure 9:
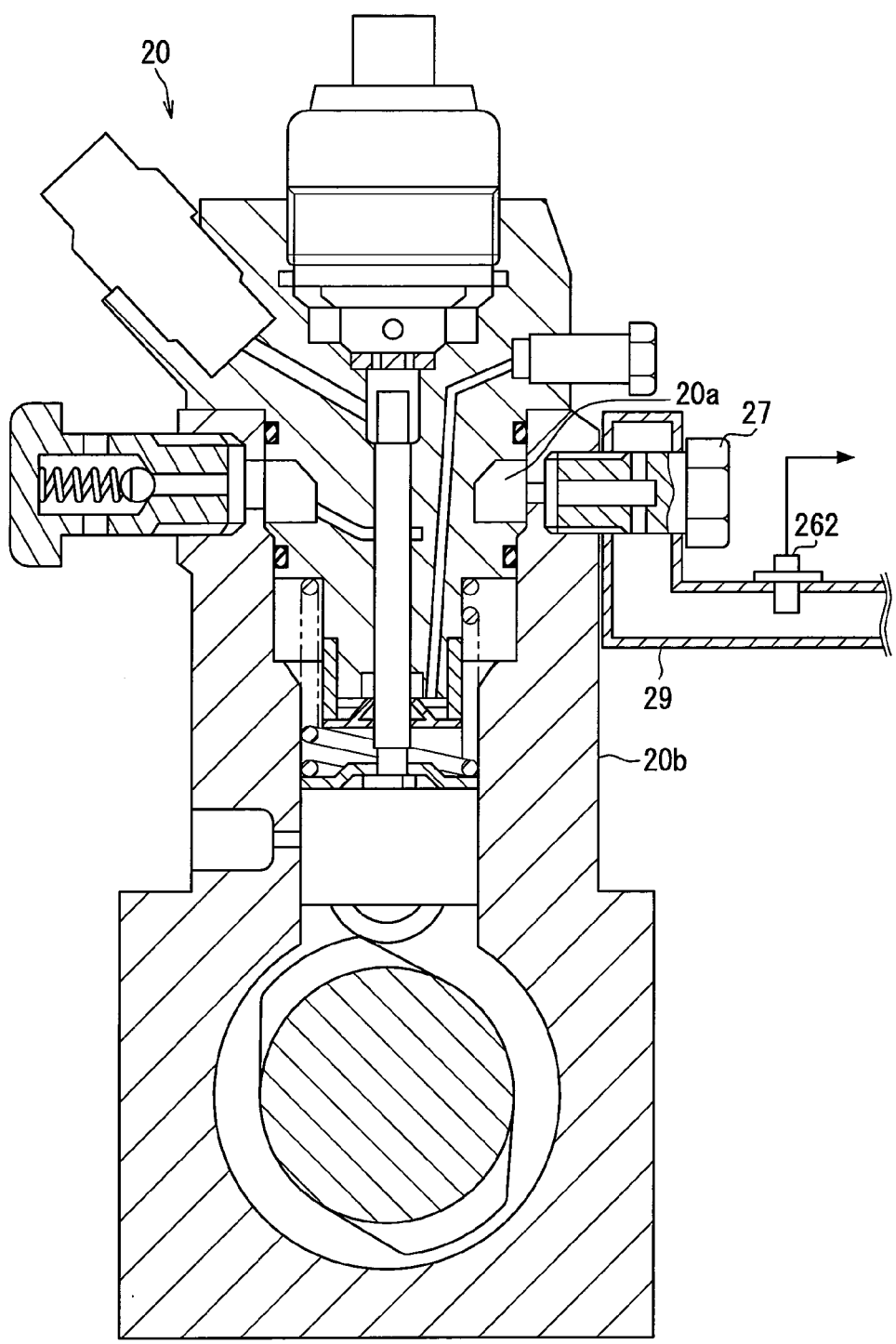
FIG. 9 is an illustration to illustrate an example in which a second suction temperature sensor is arranged in a supply pump.

Still further, the second suction temperature sensor 262 can be fixed to, for example, the inlet side hollow screw 27 shown in FIG. 9. Specifically, the second suction temperature sensor 262 is inserted into the insertion hole formed in the inlet side hollow screw 27 and hence can measure the fuel temperature in the fuel gallery 20a. According to the construction described above, even if the insertion hole is not formed in the housing 20b, the fuel temperature in the fuel gallery 20a can be measured.

The respective temperature sensors in the embodiments described above may be so constructed as to measure the temperature on the basis of, for example, a change in the resistance value of a thermistor or the like or may be so constructed as to measure the temperature on the basis of voltage generated in a thermocouple. In addition, the positions in which the temperature sensors are set and the number of the temperature sensors to be set may be changed as appropriate. Further, the measured temperature to be compared when a decrease in the temperature of the liquefied gas fuel is detected, as is the case with the first embodiment described above, may be the measured values of the temperature sensors arranged next to each other in the fuel passage 70 or, as is the case with the third embodiment described above, may be the measured value of the specified temperature sensor.

The respective allowances $\alpha 1$ to $\alpha 4$ used in the first embodiment described above are values set in advance. However, an allowance used for setting a threshold temperature may be changed according to an operating state and the like of the internal combustion engine. For example, each of the threshold values may be set, for example, by multiplying the measured value of each of the temperature sensors by a factor less than 1. In addition, in the embodiments described above, when the measured values of the fuel temperature are not more than the respective threshold temperatures, it is determined that the fuel leak is caused, but for example, when the measured values of the fuel temperature are less than the respective threshold temperatures, it may be determined that the fuel leak is caused.

In the diagnosis processing of the embodiments described above, of the section in which it is determined that the fuel leak is caused, in particular, a construction which is at high risk for causing a fuel leak is specified and it is determined that the fuel leak is caused around the construction. For example, in S211 of the second embodiment (see FIG. 6), it is not simply determined "that the fuel leak is caused in the section from the suction port of the feed pump to the suction port of the supply pump" but it is determined "that the fuel leak is caused in the surroundings of the feed pump". A determination to specify a position in which the fuel leak is caused does not need to be made. Also diagnosis processing to simply determine that the fuel leak is caused in a section between two positions in which the temperature sensors are set can be naturally performed.

In the embodiments described above, the DME fuel has been exemplified as the liquefied gas fuel supplied to the internal combustion engine by the fuel supply system. However, the liquefied gas fuel is not limited to the DME fuel. For example, a diesel fuel such as light oil including DME as a main component can be used as the liquefied gas fuel. In addition, a liquefied natural gas (LNG) and a liquefied petroleum gas (LPG) can be used as the liquefied gas fuel.

The function supplied by the control device of the embodiments described above may be a function block of a processor to perform a specified program or may be realized by a dedicated integrated circuit. Alternatively, the respective functions may be provided by hardware or software different from those described above or a combination of the hardware and the software.

For example, in the embodiments described above, an electronic control unit to comprehensively control the internal combustion engine and the fuel supply system serves as the control device and performs "the abnormality diagnosis method". However, a control device dedicated for an abnormality diagnosis apparatus may be provided as a construction different from the electronic control unit to control the internal combustion engine and the fuel supply system and may perform "the abnormality diagnosis method".

In the embodiments has been described the example in which the present disclosure is applied to the abnormality diagnosis apparatus that diagnoses the fuel leak from the fuel passage to supply the fuel to the internal combustion engine mounted in the vehicle. However, the present disclosure can be applied not only to the abnormality diagnosis apparatus that diagnoses the fuel leak from the fuel passage belonging to the internal combustion engine mounted in the vehicle but also to an abnormality diagnosis apparatus that diagnoses a fuel leak from a fuel passage belonging to an internal combustion engine or an external combustion engine of a ship, a railway vehicle, and an airplane. Further, the present disclosure can be applied also to an abnormality diagnosis apparatus that diagnoses a fuel leak from a fuel passage belonging to an internal combustion engine or an external combustion engine for a power generation plant.

What is claimed is:

1. An abnormality diagnosis apparatus that diagnoses a fuel leak from a fuel passage to circulate a liquefied gas fuel between a fuel tank and an engine, the fuel passage including a low pressure pump, which pressure-feeds the liquefied gas fuel stored in the fuel tank, and a high pressure pump, which pressurizes and pressure-feeds the liquefied gas fuel discharged from the low pressure pump to the engine, the abnormality diagnosis apparatus comprising:

a first measuring part that is arranged at a first part of the fuel passage and that measures a temperature of the liquefied gas fuel discharged from a discharge port of the low pressure pump;

a second measuring part that is arranged at a second part of the fuel passage and that measures the temperature of the liquefied gas fuel emitted without being pressurized from the high pressure pump; and a determination part that detects a decrease in the temperature of the liquefied gas fuel at the second part on the basis of a comparison between a measured value of the first measuring part and a measured value of the second measuring part, thereby determining that the fuel leak is caused in a section from the discharge port as the first part to the high pressure pump as the second part on the basis of a comparison between the respective measured values.

2. The abnormality diagnosis apparatus according to claim 1, further comprising:

a tank measuring part that measures a temperature in the fuel tank, wherein the determination part detects a decrease in the temperature of the liquefied gas fuel at the discharge port on the basis of a comparison between a measured value of the tank measuring part and the measured value of the first measuring part, thereby determining that the fuel leak is caused in a section from the fuel tank to the low pressure pump.

3. The abnormality diagnosis apparatus according to claim 2, wherein the determination part determines the fuel leak caused in the section from the discharge port to the high pressure pump and then determines the fuel leak caused in the section from the fuel tank to the low pressure pump.

4. The abnormality diagnosis apparatus according to claim 2, wherein the determination part sets a low-pressure-threshold temperature lower than the measured value of the tank measuring part and in a case where the measured value of the first measuring part is lower than the low-pressure-threshold temperature, the determination part determines that the fuel leak is caused in the section from the fuel tank to the low pressure pump, and wherein the determination part sets a high-pressure-threshold temperature lower than the measured value of the first measuring part and in a case where the measured value of the second measuring part is lower than the high-pressure-threshold temperature, the determination part determines that the fuel leak is caused in the section from the discharge port to the high pressure pump.

5. The abnormality diagnosis apparatus according to claim 4, wherein a difference between the measured value of the tank measuring part and the low-pressure-threshold temperature is larger than a difference between the measured value of the first measuring part and the high-pressure-threshold temperature.

6. The abnormality diagnosis apparatus according to claim 1, diagnosing a fuel leak from the fuel passage including a leak fuel line, which circulates the liquefied gas fuel as a leak fuel emitted from an emission port of the high pressure pump, and a shutoff valve, which switches between circulating and interrupting the liquefied gas fuel in the leak fuel line, and the abnormality diagnosis apparatus further comprising:

a third measuring part that measures a temperature of the liquefied gas fuel flowing into an inflow port of the shutoff valve, wherein the determination part detects a decrease in the temperature of the liquefied gas fuel at the inflow port on the basis of a comparison between the measured value of the second measuring part and a measured value of the third measuring part, thereby determining that the fuel leak is caused in a section from the emission port to the inflow port.

7. The abnormality diagnosis apparatus according to claim 6, wherein the determination part determines the fuel leak caused in the section from the emission port to the inflow port and then determines the fuel leak caused in the section from the discharge port to the high pressure pump.

8. The abnormality diagnosis apparatus according to claim 6, wherein the determination part sets a high-pressure-threshold temperature lower than the measured value of the first measuring part and in a case where the measured value of the second measuring part is lower than the high-pressure-threshold temperature, the determination part determines that the fuel leak is caused in the section from the discharge port to the high pressure pump, and wherein the determination part sets a return threshold temperature lower than the measured value of the second measuring part and in a case where the measured value of the third measuring part is lower than the return threshold temperature, the determination part determines that the fuel leak is caused in the section from the emission port to the inflow port.

9. The abnormality diagnosis apparatus according to claim 8, wherein a difference between the measured value of the first measuring part and the high-pressure-threshold temperature is larger than a difference between the measured value of the second measuring part and the return threshold temperature.

10. The abnormality diagnosis apparatus according to claim 6, diagnosing a fuel leak from the fuel passage including the leak fuel line to return the liquefied gas fuel as the leak fuel, which is not used for combustion in the engine, to the fuel tank, and the abnormality diagnosis apparatus further comprising:

a fourth measuring part that is arranged at a high temperature part closer to the engine than the inflow port of the leak fuel line and that measures a temperature of the liquefied gas fuel emitted from the engine, wherein the determination part detects a decrease in the temperature of the liquefied gas fuel in the high temperature part on the basis of a comparison between the measured value of the third measuring part and a measured value of the fourth measuring part, thereby determining that the fuel leak is caused in a section from the inflow port to the engine.

11. An abnormality diagnosis apparatus that diagnoses a fuel leak from a fuel passage to circulate a liquefied gas fuel between a fuel tank and an engine, the fuel passage including a low pressure pump, which pressure-feeds the liquefied gas fuel stored in the fuel tank, and a high pressure pump, which pressurizes and pressure-feeds the liquefied gas fuel discharged from the low pressure pump to the engine, the abnormality diagnosis apparatus comprising:

a first measuring part that is arranged at a first part of the fuel passage and that measures the temperature of the liquefied gas fuel sucked into a low pressure suction port of the low pressure pump, a second measuring part that is arranged at a second part of the fuel passage and that measures a temperature of the liquefied gas fuel sucked into a high pressure suction port of the high pressure pump, and a determination part that detects a decrease in the temperature of the liquefied gas fuel at the second part on the basis of a comparison between a measured value of the first measuring part and a measured value of the second measuring part and that determines that the fuel leak is caused in a section from the low pressure suction port as the first part to the high pressure suction port as the second part on the basis of the comparison between the respective measured values.

12. An abnormality diagnosis apparatus that diagnoses a fuel leak from a fuel passage to circulate a liquefied gas fuel between a fuel tank and an engine, the fuel passage including a low pressure pump, which pressure-feeds a liquefied gas fuel stored in a fuel tank and a high pressure pump, which pressurizes and pressure-feeds the liquefied gas fuel discharged from the low pressure pump to the engine, and the abnormality diagnosis apparatus comprising:

a first measuring part that is arranged at a first part of the fuel tank and that measures a temperature in the fuel tank, a second measuring part that is arranged at a second part of the fuel passage and that measures the temperature of the liquefied gas fuel discharged from a discharge port of the low pressure pump, a third measuring part that measures the temperature of the liquefied gas fuel pressurized by the high pressure pump, and a determination part that detects a decrease in the temperature of the liquefied gas fuel at the second part on the basis of a comparison between the measured value of the first measuring part and the measured value of the second measuring part, thereby determining that the fuel leak is caused in a section from the fuel tank as the first part to the discharge port as the second part, and that detects a decrease in the temperature of the liquefied gas fuel at the high pressure pump on the basis of a comparison between the measured value of the first measuring part and a measured value of the third measuring part, thereby determining that the fuel leak is caused in a section from the discharge port to the high pressure pump.

* * * * *